United States Patent [19]

Poultney

[11] Patent Number: 4,729,658
[45] Date of Patent: Mar. 8, 1988

[54] VERY WIDE SPECTRAL COVERAGE GRATING SPECTROMETER

[75] Inventor: Sherman K. Poultney, Wilton, Conn.

[73] Assignee: The Perkin-Elmer Corporation, Norwalk, Conn.

[21] Appl. No.: 871,056

[22] Filed: Jun. 5, 1986

[51] Int. Cl.⁴ .............................. G01J 3/18; G01J 3/36
[52] U.S. Cl. ...................................... 356/328; 356/334
[58] Field of Search ............... 356/305, 308, 328, 332, 356/334, 412; 250/226

[56] References Cited

U.S. PATENT DOCUMENTS

| | | | |
|---|---|---|---|
| 3,216,315 | 11/1965 | Keller | 356/334 |
| 3,363,525 | 1/1968 | Teeple, Jr. | 356/305 X |
| 3,567,322 | 3/1971 | Brehm et al. | 356/332 |
| 3,791,737 | 2/1974 | Johansson | 356/328 X |
| 3,929,398 | 12/1975 | Bates | 356/328 X |
| 4,060,326 | 11/1977 | Tirabassi et al. | 356/328 |
| 4,060,327 | 11/1977 | Jacobonitz et al. | 356/328 |
| 4,253,765 | 3/1981 | Kato et al. | 356/328 |
| 4,484,817 | 11/1984 | Nobuto et al. | 356/419 X |
| 4,650,321 | 3/1987 | Thompson | 356/328 X |

FOREIGN PATENT DOCUMENTS 54-49154  4/1979  Japan .................. 356/334

Primary Examiner—Vincent P. McGraw
Attorney, Agent, or Firm—Thomas P. Murphy; Paul A. Fattibene; Edwin T. Grimes

[57] ABSTRACT

A very wide spectral coverage grating spectrometer which gathers light from a scene being viewed and collimates that light. A mosaic grating is disposed in collimated space which disperses the collimated light. The dispersed light is focused onto a detector array.

19 Claims, 7 Drawing Figures

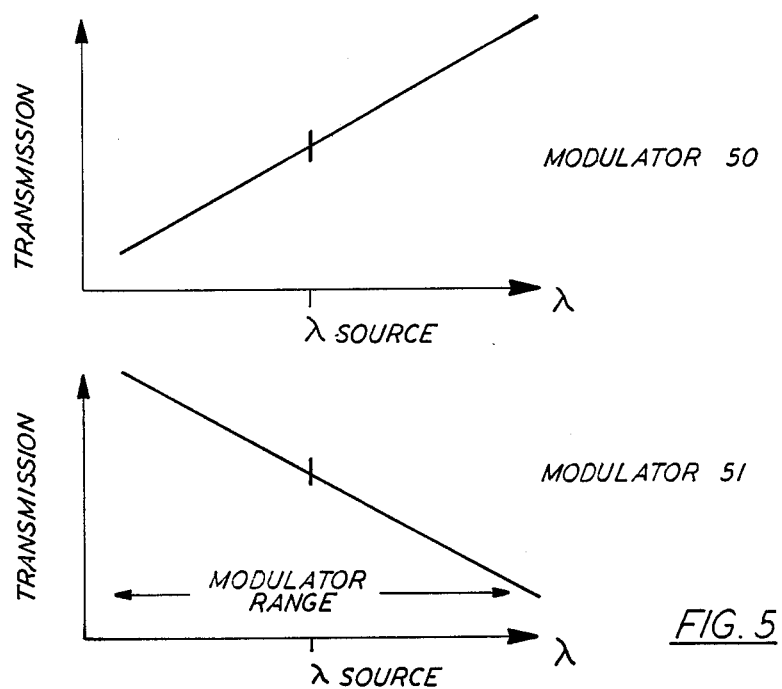
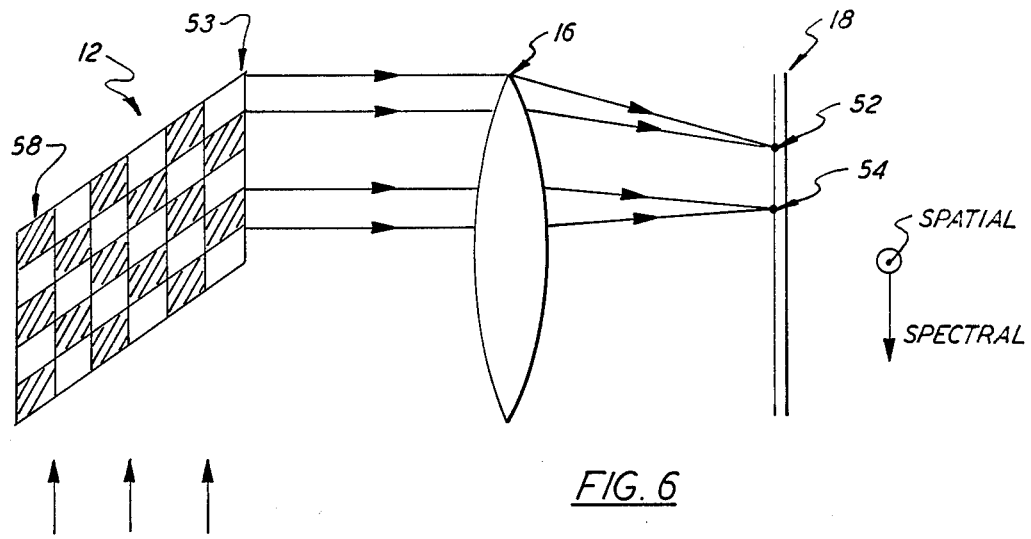
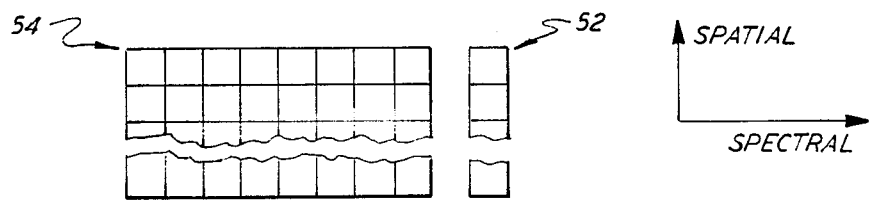
FIG. 5
FIG. 6
FIG. 7

VERY WIDE SPECTRAL COVERAGE GRATING SPECTROMETER

FIELD OF THE INVENTION

The present invention relates to large satellite borne spectrometer systems and, more particularly, to such systems which have a very wide spectral coverage.

BACKGROUND OF THE INVENTION

As spectrometer/telescopes are called upon to be ever more broad (e.g., wide simultaneous spectral coverage), flexible in their application and sensitive in terms of power received, their complexity and size necessarily increase.

Presently proposed spectrometers, to achieve desired very wide spectral coverage at high sensitivity, would require a series of spectrometer systems to span the wide spectral region at a substantially large cost and volume.

Such an approach would be to provide a plurality of beamsplitters in the collimated beam each of which would split off different spectral bands. Each of the spectral bands, so split off, would go to a different grating clustered out around the back of the telescope. This would require a very large package to accomplish the desired goal, and would b prohibitively expensive.

Another approach would be to provide a plurality of telescope and associated spectrometers; one for each spectral band.

The present invention overcomes these disadvantages by providing a very wide spectral coverage grating spectrometer which achieves high spectral resolution, at relatively low cost, in a relatively compact package and with high sensitivity.

BRIEF DESCRIPTION OF THE PREFERRED EMBODIMENT

The present invention contemplates providing a single telescope/spectrometer system having very wide spectral coverage. A large diameter telescope collects light from a scene being viewed. The collected light is then collimated and directed to an array or mosaic of reflective grating elements. The grating elements cover different parts of the spectrum. From the grating the diffracted light is redirected and focused by a mirror onto a plurality of detector arrays. The main mosaic element is oriented to place its first order spectra on one detector array and the other mosaic elements are oriented to place their first order spectra on corresponding detector arrays. One can use zero order spectra from these elements to provide an image of the scene being viewed.

A variety of alternate forms of the above-described telescope/interferometer are provided which, utilizing the same optics, approach full performance by using smaller size detector arrays. The same optics can then be upgraded in an evolutionary manner to achieve full performance as detector arrays become available.

One such evolutionary form of the present invention is realized by replacing selected ones of the grating elements by plane mirrors. The mirrors are oriented so as to place images of the scene on detector arrays of appropriate response to thus obtain spectral coverage. Spectral resolution is obtained by passing the light reflected from the mirror elements through a matched pair of spectral modulators, filters or etalons.

Another such evolutionary approach is provided by a spectrometer/telescope as described above wherein selected grating elements are replaced by grating pairs which provide coarse and fine spectral resolution, respectively. The light dispersed from a coarse grating is focused on a detector array to give spectral coverage. Higher spectral resolution with narrower coverage is obtained by focusing light dispersed by a fine grating on the same or another array.

By replacing selected ones of the grating elements with blazed gratings, light diffracted from the grating can be placed in any desired order in a very efficient manner.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which the disclosure is based may readily be utilized as a basis for designing other structures for carrying out the several purposes of the invention. It is important, therefore, that the claims be regarded as including such equivalent structures as do not depart from the spirit and scope of the invention.

Specific embodiments of the invention have been chosen for purposes of illustration and description, and are shown in the accompanying drawings, forming a part of the specification.

BRIEF DESCRIPTION OF THE DRAWINGS

FIG. 5 is a graphical representation of a spectral modulation pair shown in FIG. 4 in accordance with the present invention;

FIG. 6 is a schematic representation of another embodiment of a very wide coverage grating spectrometer in accordance with the present invention; and FIG. 7 is a schematic representation of the detector arrays useful in the embodiment of FIG. 6.

DETAILED DESCRIPTION OF THE PREFERRED EMBODIMENT

Figure 1:
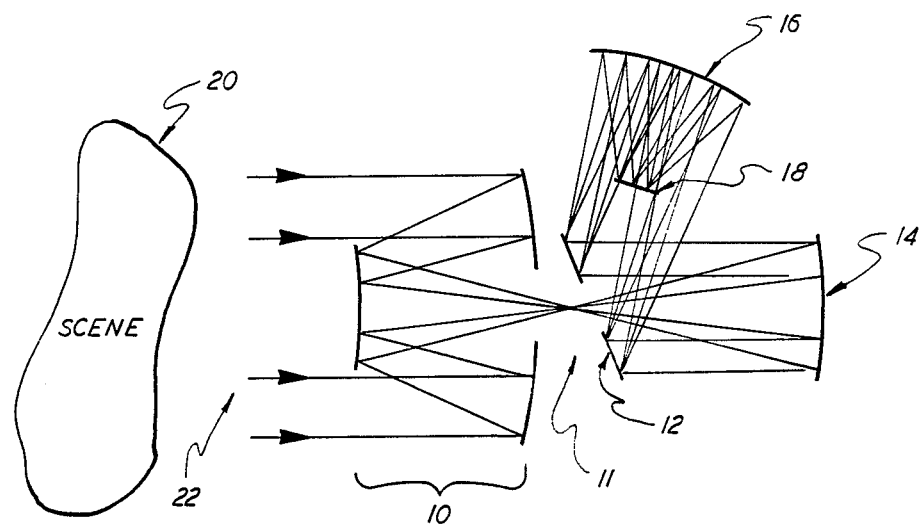
FIG. 1 is a plan view of an embodiment of a very wide spectral coverage grating spectrometer in accordance with the present invention.

FIG. 1 is a plan view of one embodiment of a very wide band spectral coverage grating spectrometer in accordance with the present invention.

Light, designated by arrows 22, from a scene being viewed 20 is collected by a telescope 10. The light exits the telescope 10 and passes through the central aperture 11 of a grating mosaic 12 and is reflected and collimated by a collimating mirror 14. The collimated light is thereupon diffracted by the grating mosaic 12 in a manner described hereinbelow in reference to FIG. 2. The diffracted light is then re-directed and focused by mirror 16 onto a focal plane 18.

Figure 2:
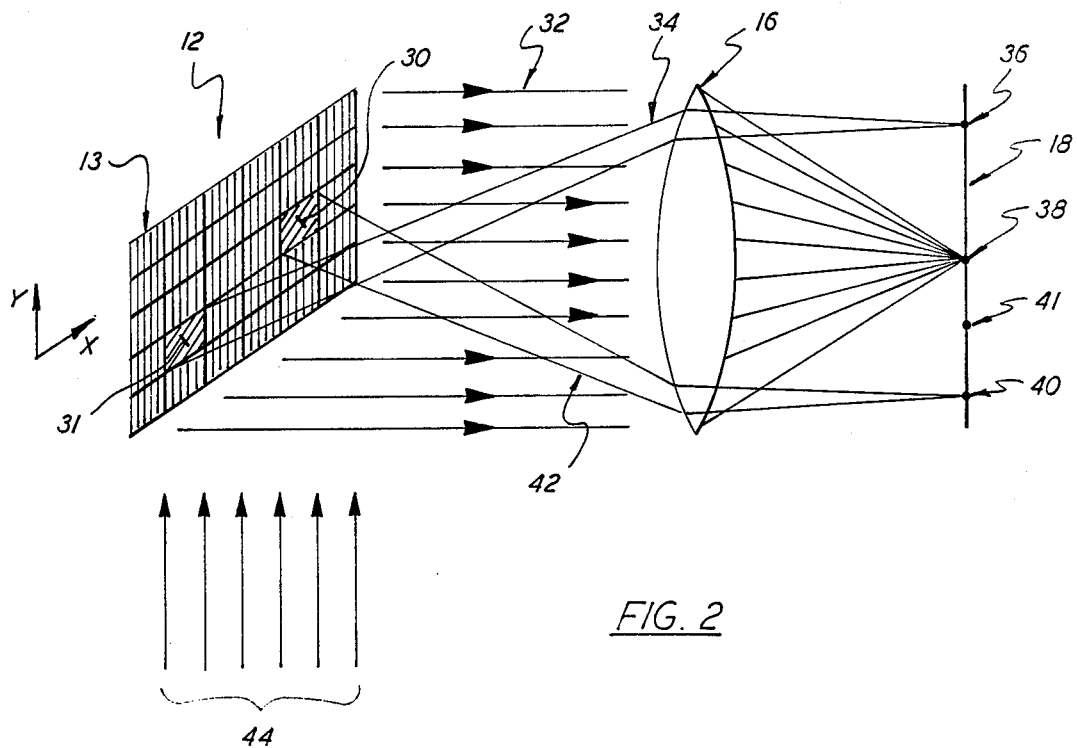
FIG. 2 is a schematic representation of the embodiment of FIG. 1.

FIG. 2 shows, schematically, the spectrometer of FIG. 1. The grating mosaic 12 is comprised of a plurality of grating segments 13. Each element 13 might be, for example, 20×20 cm with the entire grating mosaic 12 containing 10×10 elements 13. Each of the grating segments 13 is fabricated separately and a plurality of such grating segments 13 are assembled together to form a mosaic grating 12. As is understood by those skilled in the art, gratings can be fabricated that are useful in examining different portions of the electromagnetic spectrum. The surface of the grating is ruled with many parallel lines. Spacing of the grating lines and angles of incidence determine which of the spectrum lines will be viewed. Accordingly, by replacing certain of the grating segments 13 in the mosaic grating 12 with individual gratings which cover other parts of the spectral range the breadth of spectral coverage of the spectrometer of FIG. 2 can be expanded. Gratings 30 and 31 are two such individual gratings.

A further feature of the present invention is that individual gratings 30 and 31 are oriented independently of the main mosaic grating 12. In this way the light diffracted from individual gratings 30 and 31, indicated as 42 and 34 respectively, can be focused by mirror 16 at detector arrays 40 and 36, respectively, in the focal plane 18. It should be understood that the number, hence area, of individual gratings 30 or 31 may be increased as the size of the mosaic grating 12 is concomitantly decreased. Such a proportionate increase in size would be necessary where the relative intensity of the spectra being examined by individual gratings 30 or 31 is less than that being examined by the main mosaic grating 12. It can be understood by those skilled in the art that the composite set of gratings in the main mosaic grating 12 or a plurality of individual gratings 30 or 31 need only add incoherently for good spectral resolution. In this context we mean "incoherent" to be taken as overlapping the spectra from many elements 13. "Coherent" means aligning elements 13 to act as a single large element which has been precisely ruled. That is, a single mosaic element 13 has a sufficient density of ruled lines, or grating lines, to achieve the desired spectral resolution. Higher spectral resolution could thus be achieved but at the expense and difficulty of coherently aligning the elements.

It should be noted, at this point, that the mirror 16 of FIG. 1 is represented as a refractive element in FIG. 2 for the clarity of illustration. Hence, it will be designated as mirror 16.

Thus, the compound plane mosaic grating 12 sits in collimated space, being in the path of collimated light 44, at the image of the system entrance pupil. The light 32 diffracted from the main mosaic 12 is brought to a focus by mirror 16 at detector array 38 on focal plane 18. Proper orientation of individual grating 30 allows its diffracted light 42 to be focused by mirror 16 at detector array 40 in the focal plane 18. Likewise, the diffracted light 34 from grating 31 is focused by mirror 16 at detector array 36 on focal plane 18. The main mosaic 12 produces a field of view, or zero order, image at a detector array 41 on the focal plane 18.

Figure 3:
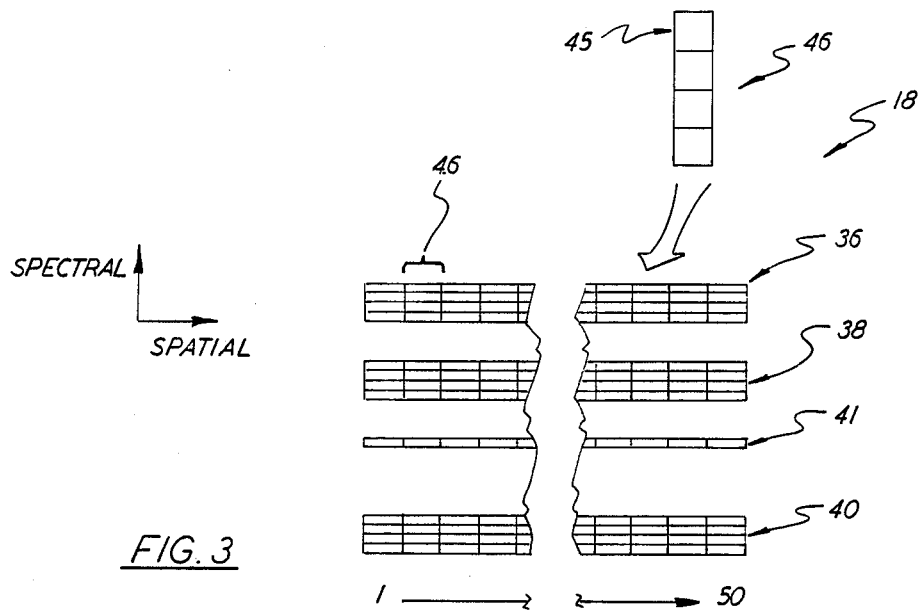
FIG. 3 is a schematic representation of the detector arrays useful in the embodiment of FIG. 1.

FIG. 3 shows the focal plane 18, of FIGS. 1 and 2. The focal plane 18 includes detector arrays 36, 38 and 40 corresponding to the diffracted first order spectra from individual grating 31, mosaic grating 12 and individual grating 30, respectively, focused by lens 16. Also shown is detector array 41 which corresponds to the zero order spectra, or image of the field of view, of the main mosaic 12. Each of the detector arrays 36, 38 and 40 includes a plurality of detector elements 46 which look at a particular location in the field of view. A magnified view of one of the detector elements 46 is shown in FIG. 3. It can be seen that the detector elements 46 are further divided into a plurality of detector pixels 45. As shown in FIG. 3, these detector pixels 45 give the detector arrays 36, 38 and 40 spectral resolution. That is, the spectra are focused on the detector arrays such that the detector pixels 45 view a different portion of the spectra. Detector array 41 is disposed in the focal plane 18 so as to view the zero order of the mosaic grating 12. Detector array 41 has a spectral extent of one detector pixel 45 since in viewing the zero order no spectral reolution is required or available. The spectra are detected by detector arrays 36, 38, 41 and 40 which generate signals and are processed by signal processing means, not shown, in a manner known to those skilled in the art of spectrometry.

The following dimensions of field of view (fov) and detector array size are given as examples only so that a relative comparison between the alternate embodiments of the spectrometer described herein can be more readily made.

The aperture of the telescope/spectrometer systems described herein are sized such that the zero order of the field of view (fov), when imaged on the detector array 41, produces an image of, for example, 1×50 pixels. That is, an image 1 pixel high in the spectral direction and 50 pixels wide in the spatial direction.

For the system described herein in reference to FIG. 1 the first order spectra, imaged onto the detector arrays 36, 38 and 40 of FIG. 3, cover a detector array of, for example, 50×100 pixels. That is, 50 pixels in the spatial direction by 100 pixels in the spectral direction. Such a configuration gives maximum sensitivity and high spatial and spectral resolution. As shown in FIG. 3 each detector array 36, 38 and 40 covers 4×50 detector pixels. Accordingly, to produce a 50×100 pixel array the detector arrays 36, 38 and 40 would each have to be increased twenty-five times in the spectral direction. Detector array 41, as shown, covers 1×50 detector pixels.

For some applications the large focal plane detector arrays, in some wavelength regions, currently may not be available or may be prohibitively expensive. Accordingly, in such situations it is desirable to replace the larger, e.g. 100×50 pixel, detector arrays 36, 38 and 40 with smaller ones without sacrificing very wide spectral coverage or spectral resolution. In embodiments described herein, where the size of the detector arrays are changed from that described hereinabove, the optical elements of the telescope 10, collimator 14 and mirror 16 remain unchanged in size and orientation, only the grating 12 and detector array 18 are changed. In this way the spectrometer can be later upgraded to full performance in an evolutionary manner at a relatively low cost.

Figure 4:
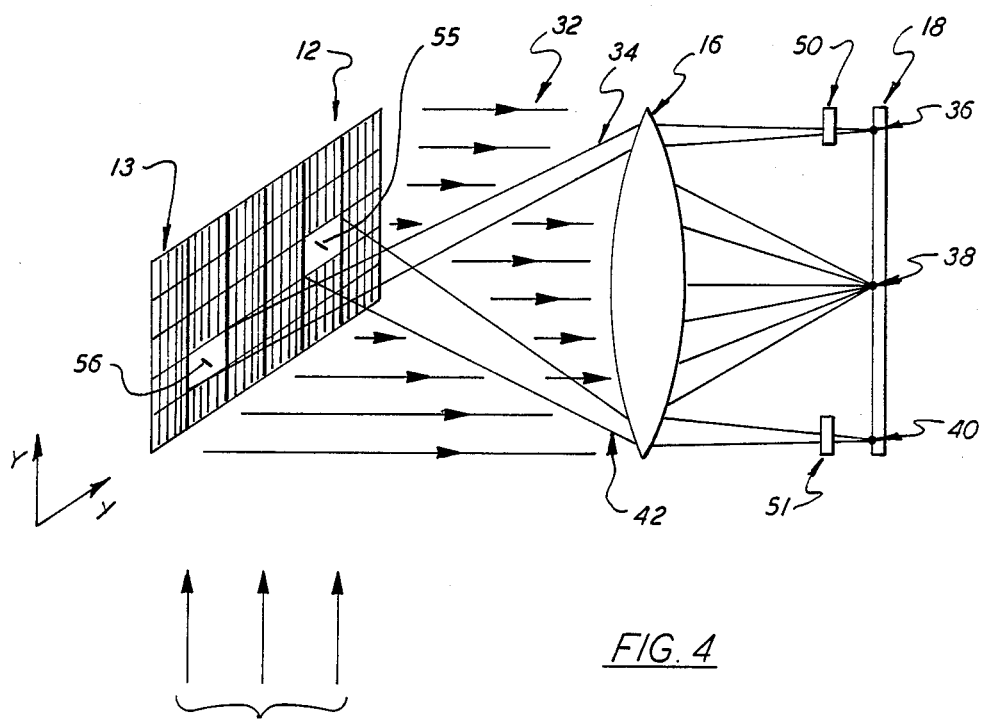
FIG. 4 is a schematic representation of another embodiment of a very wide coverage grating spectrometer in accordance with the present invention.

In the embodiment of the present invention shown schematically in FIG. 4 the mosaic grating 12 has the individual mosaic grating elements of FIG. 2 replaced by plane mirrors 55 and 56. As in the case of the individual mosaic grating elements of FIG. 2 the plane mirrors 55 and 56 are slightly rotated about the x axis to place the images of the scene at different locations on the focal plane 18, that is detector arrays 40 and 36, respectively. In this embodiment the detector arrays 40 and 36 view only the fov and are, consequently, smaller than the arrays of FIG. 3. Assuming, for example, the fov to be 1×50 pixels the detector arrays are also 1×50 pixels, 1 pixel is in the spectral direction and 50 pixels in the spatial direction. Accordingly, the spatial resolution is retained. Spectral coverage and resolution are obtained by using detector arrays 40 and 36 of the appropriate response for the desired spectral region and through the use of spectral modulators 50 and 51 located in the path of the beams 34 and 42 focused from mirrors 56 and 55, respectively, by mirror 16 onto detector arrays 36 and 40, respectively.

The spectral modulators 50 and 51 have a wavelength dependent transmission across the whole spectral region of interest as shown in FIG. 5. The transmission of the two modulators 50 and 51 are chosen such that they are opposite to one another but equal at the source wavelength, $\lambda$ source. Thus, detection of $\lambda$ source is indicated when the modulators 50 and 51 are at maximum correlation.

It should be understood that two modulators, and consequently two detector arrays, must be used for each spectral region to be examined in the whole range. This approach is particularly effective for light sources with one or several narrow emission regions, since the range of any modulator depends on the background light.

While the spectral modulators 50 and 51 are shown adjacent to the detectors 36 and 40, respectively, it should be understood that the modulators can be placed anywhere after the plane mirrors 56 and 55. If, however, the spectral modulators chosen have a spectral response which is angle-dependent, such as interference or Fabry-Perot filters, they must be disposed on the plane mirrors 56 and 55 to maintain faithful spectral filtering.

Alternately, the spectral modulators 50 and 51 could be replaced by narrow-band filter, such as interference filters or Fabry-Perot etalons which pass only the wavelength of the source of interest, $\lambda$ source. This option gives less spectral coverage, but more certain detection of a source with narrow spectral output.

Another form of the spectrometer of FIG. 2 could be used to achieve the same spectral coverage while reducing the size of the detector arrays required. In this form, the grating elements 13 of FIG. 2 are replaced by coarse and fine grating element pairs. For the purposes of illustration consider one of such grating pairs to be individual grating elements 30 and 31, where element 30 is a fine grating element and element 31 is a coarse grating element. In this context the terms coarse and fine refer to grating ruling spacing which, as is known, affects the relative spacing of spectral lines but not their intensities. By bringing the diffracted spectra of two or more elements to a focus on the focal plane 18 at the same detector array, 40 for example, the intensity at that detector is enhanced. The relative orientation of the grating elements need not be absolutely controlled as the spectra need only add incoherently. If the second grating element of a pair were chosen such that the line spacing were less or finer, the spectral dispersion would increase. Further, the fine grating element is movable so that its spectral band is also placed on detector array 40. In this way spectral resolution can be concomitantly increased.

A coarse spectra from coarse grating element 31 is brought to focus on the detector element 40. A different spectral band falls incident on each of the detector pixels 45 of FIG. 3. The fine grating 30 can be adjusted to bring one band of the coarse spectra to the same of different detector array to provide much higher spectral resolution. If placed on the same detector array, e.g., 4×50 pixel array, one could locate a spectral line from the coarse grating 31 on one of four detector pixels 45 and then the same spectral line from the fine grating 30 on the same detector pixels 45 giving a spectral resolving power of 4×4, or 16×. Alternatively, the light dispersed from the coarse and fine gratings can be focused on two separate arrays, such as two 4×50 pixel arrays. In this way an 8×50 array could give, for example, a spectral resolution of 16 by proper choice and orientation of grating element.

FIG. 6 shows another embodiment of the optics useful in the spectrometer of FIG. 1.

As is known in the art gratings can be blazed so as to diffract light very efficiently into a particular diffraction order. Accordingly the mosaic grating 12 is provided with alternately plane mirrors 53 which place light into the zero order and blazed gratings 58 which diffract light into, for example, the first order. All the light from mirrors 53 is brought to a focus at detector elements 52, also shown in FIG. 7, which could, for example, be a 1×50 array. Likewise, all of the light diffracted from blazed gratings 58 is brought to a focus at detector elements 54, also shown in FIG. 7 which could, for example, be an 8×50 element array. It should be understood that any number of orders can be viewed in this way by providing properly blazed grating elements, the light from which is focused at appropriate detectors on the detector array 18.

The detector arrays 52 and 54 are disposed on the detector array plane 18 of FIG. 6. The detector array 52 has 1×50 elements giving one element for spectral resolution and 50 elements for spatial resolution in the zero order. Detector array 54 senses the first order diffracted radiation with 50 elements for spatial resolution and eight elements for spectral resolution.

There has thus been provided a very wide spectral coverage grating spectrometer which achieves high sensitivity and high spectral resolution at relatively low cost and in a compact package. In addition, several embodiments of such a spectrometer have been provided which accomplish the above goals while utilizing a smaller focal plane detector array.

Other modifications of the present invention are possible in light of the above description which should not be deemed as limiting the invention beyond those limitations contained in the claims which follow.

What is claimed is:

1. A very wide spectral coverage grating spectrometer which comprises:
    light gathering means to gather light from a scene being viewed;
    collimating means to collimate the light from a scene being viewed;
    a two dimensional substantially continuous mosaic grating array, disposed in collimated space, having a plurality of grating elements in each of the two dimensions, said plurality of grating elements being comprised of at least two different grating rulings;
    a plurality of substantially continuous detector arrays disposed substantially on a single focal plane; and
    focusing means to focus light diffracted from said mosaic grating onto said single focal plane.

2. A very wide spectral coverage grating spectrometer as claimed in claim 1 wherein said light gathering means is a telescope.

3. A very wide spectral coverage grating spectrometer as claimed in claim 1 wherein said mosaic grating is disposed substantially on the same plane.

4. A very wide spectral coverage grating spectrometer as claimed in claim 3 wherein each of said grating elements is individually rotatable so as to bring the spectra dispersed therefrom to a focus at any desired location on said detector array.

5. A very wide spectral coverage grating spectrometer as claimed in claim 4 wherein said mosaic grating elements is comprised of two or more groups of grating patterns each group of gratings patterns comprising two or more grating having the same grating ruling.

6. A very wide spectral coverage grating spectrometer as claimed in claim 5 wherein one of said two or more groups of grating patterns are blazed to diffract radiation into predetermined orders.

7. A very wide spectral coverage grating spectrometer as claimed in claim 6 which further includes a plurality of mirrors disposed on said mosaic grating in place of one or more of said two or more groups of grating patterns.

8. A very wide spectral coverage grating spectrometer as claimed in claim 5 which further comprises:
one of said two or more groups of grating patterns being replaced by a pair of mirrors, said pair of mirrors comprising a first mirror and a second mirror;
light reflected by said first mirror being focused by said focusing means on a first detector array;
light reflected by said second mirror being focused by said focusing means on a second detector array;
a first spectral modulator disposed between said first mirror and said first detector array;
a second spectral modulator disposed between said second mirror and said second detector array;
said first spectral modulator having a transmission that increases with wavelength;
said second spectral modulator having a transmission that decreases with wavelength; and
said first and second spectral modulators having equal transmission at a predetermined wavelength.

9. A very wide spectral coverage grating spectrometer as claimed in claim 8 which further comprises:
said first detector array having a response range coextensive with the modulator range of said first modulator; and
said second detector array having a response range coextensive with the modulator range of said second modulator.

10. A very wide spectral coverage grating spectrometer a claimed in claim 5 which further comprises:
said two or more groups of grating patterns each comprise a pair of grating elements;
said pair of grating elements comprises a coarse grating and a fine grating.

11. A very wide spectral coverage grating spectrometer as claimed in claim 10 wherein said pair of grating elements are angularly disposed so that light diffracted thereby is focused by said focusing means on a single one of said one or more detector arrays.

12. A very wide spectral coverage grating spectrometer as claimed in claim 10 wherein said pair of grating elements are angularly disposed so that light diffracted thereby is focused by said focusing means on one each of said one or more detector arrays.

13. A very wide spectral coverage grating spectrometer a claimed in claim 5 which further comprises:
one of said two or more groups of grating patterns being replaced by one or more mirrors;
light from said one or more mirrors being focused by said focusing means on a detector array;
a narrow band filter being disposed between said mirror and said detector array.

14. A very wide spectral coverage grating spectrometer as claimed in claim 13 wherein said narrow band filter is a Fabry-Perot etalon.

15. A very wide spectral coverage grating spectrometer as claimed in claim 13 wherein said narrow band filter is an interference filter.

16. A wide spectral band grating spectrometer comprising:
means for gathering light from a scene;
a two dimensional mosaic grating array, placed in the path of the light from the scene, formed by a plurality of grating elements in each of the two dimensions, and having at least two independently oriented grating elements with different diffraction characteristics than said plurality of grating elements;
first detector means for detecting the diffracted light from said plurality of grating elements; and
second detector means for detecting the diffracted light from said at least two independently oriented grating elements.

17. A wide spectral band grating spectrometer as in claim 16 wherein:
said at least two independently oriented grating elements are plane mirrors; and
said second detector means is for detecting the reflected light from said plane mirrors whereby the field of view is detected.

18. A wide spectral band grating spectrometer as in claim 17 further comprising:
spectral modulator means, placed between said plane mirrors and said second detector means, for transmitting a predetermined wavelength.

19. A wide spectral band grating spectrometer as in claim 16 wherein:
said at least two independently oriented grating elements comprise a fine grating element and a coarse grating element.

* * * * *